Patented June 6, 1950

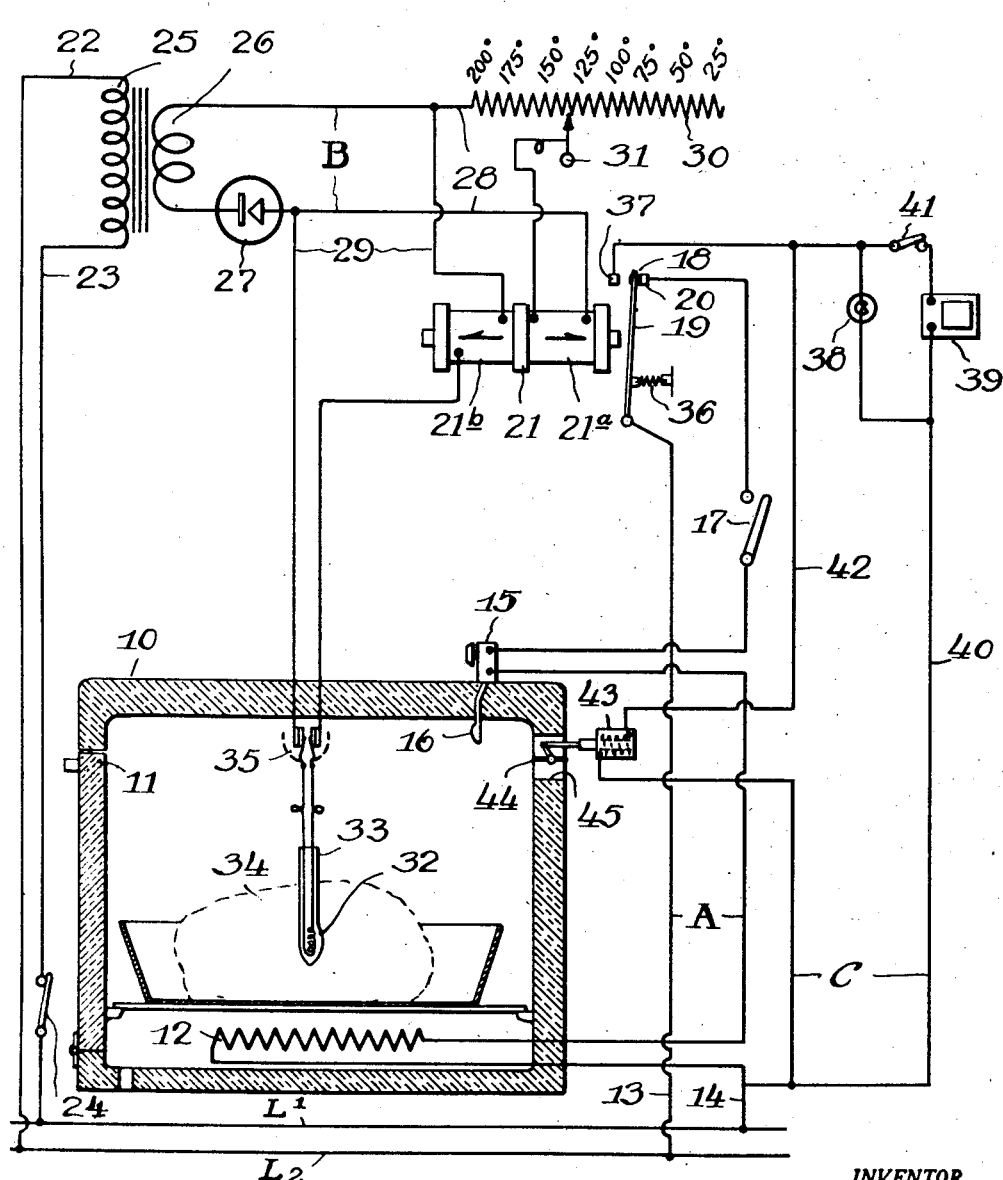

2,510,526

UNITED STATES PATENT OFFICE 2,510,526

OVEN CONTROL AND TEMPERATURE INDICATOR

Thomas R. Smith, Newton, Iowa, assignor to The Maytag Company, Newton, Iowa, a corporation of Delaware Application June 21, 1947, Serial No. 756,227

4 Claims. (Cl. 99—326)

1

The present invention relates to an attachment for the ovens of electric or gas stoves or ranges and especially to a novel method and manner of oven control and temperature indicating means for ovens operating on the retained heat or fireless cooker principle in which the cooking or roasting is continued after the source of heat has been discontinued.

In cooking or roasting in an oven of an electric or gas range or stove, it is extremely difficult for the operator to tell when the cooking or roasting has been completed. Generally, the housewife relies upon opening the oven frequently, partially or wholly withdrawing the roast or meat and relying upon the appearance thereof to apprise her when the proper roasting or cooking has been accomplished. A meat thermometer may be used but it requires opening of the oven door frequently and also partially or fully withdrawing the roast in order to check the readings. This is necessarily inconvenient and the thermometer is frequently difficult to read.

When cooking or roasting with retained heat it is extremely undesirable to open the oven door to check the meat or food or to read the thermometer to ascertain the condition thereof.

It is, therefore, an important object of the present invention to provide a novel means and method for temperature reading and oven control especially adapted for ovens operating on the retained heat principle and which will enable the operator or housewife to obtain excellent and uniform results in an electric or gas oven.

Another important feature of this invention is that when cooking on retained heat in the novel manner disclosed, the time that the roast remains in the oven beyond the point when roasting has been completed is not critical in that the temperature in the oven has gradually been reduced to prevent continued cooking after the maximum desired temperature in the center of the roast has been attained.

Another object of the present invention is the provision of means for automatically apprising the operator or housewife when the temperature in the roast or food being cooked has reached a predetermined reading.

A further important object of the present invention is the provision of a novel oven control and temperature indicator in the form of an attachment for an electric or gas range or stove and in which a thermometer or heat sensitive element is placed in the approximate center of the roast or meat and connected with an indicating means and control so constructed, connected and arranged as to disconnect or shut off the source of heat when a predetermined temperature is recorded on the thermometer and indicating means.

The invention further comprehends a novel means and method of calculating the maximum temperature required to be reached in a roast in an electric or gas stove or range operating on the retained heat principle before the source of heat is disconnected or shut off, and to permit the cooking to thereafter progress on retained heat until the maximum desired temperature has been reached in the roast.

Further objects are to provide a method and construction of maximum simplicity, efficiency, economy and ease of assembly and operation, and such further objects, advantages and capabilities as will later more fully appear and are inherently possessed thereby.

The invention further resides in the construction, combination and arrangement of parts and manner of operation diagrammatically illustrated in the accompanying drawing, and while there is shown therein a preferred embodiment, it is to be understood that the same is susceptible of modification and change, and comprehends other details, arrangements of parts and features without departing from the spirit of the invention.

In the drawing:

The single figure is a diagrammatic view of the circuit arrangement for the novel oven control and temperature indicator.

Referring more particularly to the novel illustrative embodiment and wiring diagram shown in the drawing, there is disclosed an insulated oven construction 10 provided with a door or closure 11 to permit access to the interior thereof and includes the usual shelf or shelves for supporting foodstuffs to be cooked and an electrical heating element or unit 12 for supplying heat thereto for roasting or cooking. This heating element is connected to a heating circuit A including conductors 13 and 14 to a source of electrical energy $L_1$—$L_2$ and is in series with the usual adjustable oven thermostatic control device 15 mounted on any suitable portion of the oven.

The adjustable thermostat preferably has a temperature responsive member 16 disposed in the oven and it reacts on the oven thermostat 15 to open and close the circuit to the heating element 12 to maintain the oven temperature substantially constant in accordance with the temperature selected. Also, in this circuit is a manually operable switch 17 for opening or closing the circuit when desired and it may be positioned on and made a part of the oven thermostat 15. Between the conductors 13 and 14 and in series with the heating element 12 is a contact 18 mounted on a movable armature 19 normally in engagement with a stationary contact 20 in the heating circuit and these contacts are adapted to be opened and closed by means of a double acting polarized relay 21 operated by a control or thermostatic circuit B. This relay may be of any suitable type and is utilized in a manner to be hereinafter described. It can be seen that the energization of the heating element 12 requires that the contacts on the adjustable oven thermostat 15, manual switch 17 and contacts 18 and 20 at the relay 21 be closed and that if any one of these three switches are moved to open position, energization of the heating unit or element 12 is terminated. Also when the contacts 18 and 20 are engaged prior to the operation of the relay 21 or during periods when the control circuit B is not in operation or being used the oven may be operated in the usual manner.

In order to control the heating element 12 so that foodstuffs may be cooked on heat retained in the oven, the control circuit B comprises a pair of leads or conductors 22 and 23 connected to the source of energy $L_1$ and $L_2$ through any suitable switch device 24 and they are connected to a primary 25 of a transformer. The secondary 26 of this transformer is connected to a rectifier 27, such as a selenium rectifier, to provide a unidirectional current, and beyond this are two circuits 28 and 29 connected to opposed windings $21^a$ and $21^b$, respectively, on the polarized electrical relay 21. This relay is positioned to actuate the armature 19 carrying the contact 18 from one position wherein the contacts 18 and 20 are engaged to another in which the contacts 18 and 20 are disengaged in a manner to be hereinafter described. The winding $21^a$ of the relay in the circuit 28 is wound in one direction and is in series with an adjustable resistance control member or rheostat 30 calibrated for temperature. By moving the rheostat control knob 31 to the right, the resistance increases, thus reducing the effect of the winding $21^a$ and if moved to the left the resistance to ampere flow decreases, thus increasing its magnetic effect. The winding $21^b$ and current flowing in the circuit 29 is such as to oppose the winding $21^a$ and current flowing in the circuit 28 and it is in series with a heat sensitive resistance element or thermometer 32 preferably located in a needle 33 diagrammatically shown and enlarged which is adapted to be inserted into the approximate center of a roast 34 disposed in the insulated oven 10. The conductor or wires coming from the heat sensitive or responsive element or thermometer 32 in the needle may be of any suitable length and are preferably provided with a plug 35 adapted to be inserted in a suitable receptacle mounted in the interior of the oven.

The heat sensitive element 32 has, in this example, a negative coefficient of resistance; that is, when the element is cool the resistance therethrough is relatively high and as the temperature increases the resistance decreases, thereby changing the current flow in this circuit in proportion to this change. Thus, under normal conditions when the roast is initially placed in the oven and is relatively cool the circuit 28 has a higher amperage flowing therethrough than the circuit 29 because the rheostat or control member 30 is set at a point where the resistance in the circuit is relatively low and this corresponds to the desired temperature and the resistance in the sensitive element 32 is high. Therefore, the resultant effect on the relay 21 is such as to cause the armature 19 to be held in engagement with the contact 20 by this means and also by means of the spring 36 connected to the armature. As the temperature of the heat sensitive element 32 increases during roasting, the resistance therein decreases and the current flowing through the circuit 29 gradually increases until the current flowing through winding $21^b$ equals or exceeds that in winding $21^a$. When the current in the winding $21^b$ reaches a predetermined value determined by the rheostat 30 it neutralizes or cancels out the magnetic effect in the winding $21^a$, overcomes the tension on the spring 36 and moves the contact 18 on the armature 19 in the direction to open the heating circuit A and engage the stationary contact 37. As this action takes place it can be seen that regardless of the condition or position of the oven thermostat 15, energy can no longer be supplied to the heating element 12 in the oven.

At the same time the conductor 13 energizes a warning light or bulb 38 and/or a buzzer 39 in the indicator circuit C through the contacts 18 and 37 and a conductor 40 connected to either the conductor 14 beyond the heating element or to the main $L_1$ to indicate that the desired temperature has been attained at the heat sensitive element 32. In order to stop or interrupt the audible signal given by the buzzer 39, a manual control switch 41 may be placed in series therewith to disconnect it from the circuit. Also, a conductor 42 connected in parallel with the conductor 40 energizes a magnetic solenoid 43 or other suitable device to actuate a valve 44 in the oven vent 45 to close or shut the passage. By closing the oven vent 45 at this time the heat in the oven is retained and is prevented from passing therethrough to the ambient air thereby increasing the cooking efficiency of the oven and thus provide for a longer period of cooking without the supply of additional energy.

As stated above, the present invention and temperature responsive means is primarily concerned with a unit for controlling and cutting off the supply of heat before the desired temperature at the center of the roast is attained. Thus when cooking a roast, I have found that if the electricity or other heating means is maintained until the difference in temperature at the center of the roast from the time it is placed in the oven until it reaches the temperature desired has progressed to a predetermined percentage of this total difference and the heat supply disconnected, the roast will continue to cook by reason of the heat retained in the oven. This percentage may be readily determined by operating the oven at a substantially constant temperature but with the percentage varying with each particular temperature setting of the main oven thermostat 15 with which the oven is equipped. A chart showing the various percentages may be readily formulated and supplied with each oven so that it is a simple matter for the operator or housewife to quickly determine the value or reading desired on the thermostat or adjustable rheostat 30 which is calibrated in degrees.

In the operation of the present invention, the operator or housewife inserts the thermometer or heat sensitive instrument 32 into the approximate center of the roast. The roast is then placed in the oven and the plug 35 is placed into the mating receptacle located in an accessible place within the oven. The oven door 11 is then closed and the operator turns the dial or control knob 31 on the rheostat 30 until the lights 38 and/or buzzer 39 are energized to indicate the temperature at the center of the roast. The operator knows the proper temperature the roast is to attain when cooking is completed, and by subtracting the initial temperature of the roast when placed in the oven from the ultimate temperature of the roast when cooking is completed she arrives at the temperature difference therebetween. She then takes the proper percentage of this total difference, determined from the particular oven temperature selected and controlled by the main thermostat 15 on the oven or range, and adds this amount or value to the initial temperature of the roast. The sum of these two figures is the point or indication where she sets the control knob or dial 31 of the adjustable rheostat 30 in the control circuit B which is responsive when the selected temperature at the center of the roast is attained. Thus all that is required is for the operator to apply the proper percentage for the oven temperature employed.

When the center of the roast reaches the temperature reading or setting of the thermostat 30, the relay 21 is actuated and breaks the heating circuit through the wires 13 and 14 to the heating element 12 and thereby disconnects the heating element and heat supply to the oven at the same time the oven vent 45 is closed to retain the heat therein and the light 38 and/or buzzer 39 is energized to indicate that the center of the roast has attained the selected temperature. Thereafter the roast continues to cook to completion on the retained heat. During the period of cooking on retained heat and after the circuit to the heat supply has been disconnected, the operator may quickly and at any time check the temperature at the center of the roast by merely turning or moving the control knob or dial 31 on the rheostat 30 until either the light 38 goes out or the buzzer 39 is deenergized and note the temperature at this point. Thus she can tell exactly when the roast is nearing completion or done without opening the door. After noting the temperature the operator should move the control knob in such direction as to cause the bulb 38 to light, otherwise continued energization of the heating element is likely to occur. Furthermore, when cooking on the retained heat principle and in the manner disclosed and contemplated, the time that the roast remains in the oven beyond the time when cooking has been completed is relatively unimportant for the reason that the oven temperature has been gradually reduced and prevents continued cooking.

For a clearer understanding and by way of an example, assume that the temperature of the roast at the approximate center thereof is to be 170° F. when cooking has been completed. Then assuming that the initial temperature at the center of the roast when placed in the oven prior to cooking is 40° F., by subtracting the initial temperature of 40° from the ultimate or final temperature of 170° leaves a total of 130° F. Now assuming the oven under control of the main thermostat 15 is set to maintain a constant temperature of 450° F., the operator by checking the differential reading on the chart prepared for and supplied with the oven obtains a certain predetermined percentage or constant value. This percentage is a function of the oven temperature selected and the temperature difference of the roast, and by way of example, may be 40%. Then 40% of the temperature difference or 130°, amounts to 52°, and adding this 52° to the initial temperature of 40°, equals 92°, which represents the temperature to which the control member or adjustable rheostat 30 is set.

In conformity with the above example, the oven is maintained at a substantially constant temperature of 450° F. by the main thermostat 15 until such time as the temperature at the approximate center of the roast reaches 92° F. When reaching this temperature the control or thermostat circuits acts through the relay 21 to open the heating circuit A to disconnect the heating element 12 or other heat supply, close the oven vent 45 and light the bulb 38. Thereafter the cooking continues until completion by the heat retained in the oven and by the time the temperature of the oven drops from 450° F. to 170° F., cooking of the roast will have been completed. As the temperature within the oven has gradually been reduced, very little if any cooking beyond this period takes place and it is not necessary to immediately remove the roast when done.

Although the present invention has been illustrated and disclosed as applied to an electric range or oven, it is equally adapted for use in connection with a gas range or oven in which case the direct control for the gas burner valve or heating element is positioned in the heating circuit A and is turned off when the prescribed temperature on the thermostat 30 has been reached.

In the embodiment disclosed the heat sensitive element 32 has a negative coefficient of resistance and the rheostat is calibrated accordingly so that the resistance is relatively low at high temperature settings and high at low temperature settings. By providing a heat sensitive element with a resistance which increases with temperature and reversing the temperature calibrations the control circuit would operate in the same manner.

Having thus disclosed the invention, I claim:

1. In apparatus for the cooking of a roast, an oven adapted to receive the roast and constructed and arranged to retain a portion of the heat supplied thereto, means for supplying heat to the oven, an oven thermostat responsive to the temperature in the oven for controlling the supply of heat to maintain the interior thereof at a substantially constant temperature, a control circuit comprising a heat sensitive member inserted substantially centrally in the roast, a relay for interrupting the supply of heat to the oven independently of the oven thermostat and electrically connected and responsive to the heat sensitive member whereby to interrupt the supply of heat to the oven when the roast reaches a desired internal temperature, an adjustable temperature calibrated rheostat movable to the desired internal temperature of the roast and electrically connected to the relay in opposition to the heat sensitive member to prevent operation of the relay when the heat sensitive member is below the desired temperature, an indicator energized by the operation of the relay when the heat sensitive member reaches the desired temperature and the supply of heat is interrupted, and an oven vent adapted to be closed when the indicator is energized to thereby retain the heat in the oven to permit roasting for a period of time after the source of heat has been cut off.

2. Apparatus for cooking a roast comprising an oven adapted to receive the roast and constructed and arranged to retain a portion of the heat supplied thereto, means for supplying heat to the oven, an oven thermostat responsive to the temperature in the oven for controlling the supply of heat whereby to maintain the interior thereof at a substantially constant temperature, an electrical control circuit including a temperaure responsive member inserted substantially centrally in the roast, a relay for interrupting the supply of heat to the oven independently of the oven thermostat when the roast reaches a desired internal temperature, said relay being electrically connected to the temperature responsive member and responsive thereto whereby to interrupt the supply of heat to the oven, a temperature calibrated rheostat adjustable to the desired internal temperature of the roast and electrically connected to the relay in opposition to the temperature responsive member so as to prevent the operation of the relay when the temperature of the temperature responsive member is below the desired internal temperature of the roast, indicating means energized by the operation of the relay when the temperature responsive member reaches the desired temperature and the supply of heat is interrupted, and an oven vent adapted to be closed when the indicating means is energized to thereby retain the heat in the oven to permit roasting for a period of time after the source of heat has been cut off.

3. Apparatus for cooking a roast comprising an oven adapted to receive the roast and constructed and arranged to retain a portion of heat supplied thereto, means for supplying heat to the oven, an oven thermostat responsive to the temperature in the oven for controlling the supply of heat to maintain the interior of the oven at a substantially constant temperature, an electrical control circuit including a relay for interrupting the supply of heat to the oven independently of the oven thermostat, a heat sensitive member inserted substantially centrally in the roast and electrically connected to the relay to produce a magnetic force varying with the temperature at the center of the roast whereby to open the relay and interrupt the supply of heat when the center of the roast reaches a selected temperature, an adjustable temperature calibrated rheostat electrically connected to the relay to provide a selected magnetic force in opposition to that produced by the heat sensitive member to maintain the relay closed, means for adjusting the rheostat to the selected temperature to hold a constant closing force on the relay whereby when the temperature of the heat sensitive member reaches a desired value corresponding to the selected temperature of the rheostat the relay is actuated to interrupt the supply of heat to the oven, and an indicator responsive when the relay is actuated for indicating that the desired internal temperature of the roast has been attained.

4. Means for cooking a roast comprising an oven, a heating circuit for supplying heat to the oven and including thermostatic control means for maintaining the oven at a substantially uniform temperature, and temperature responsive control means for interrupting the heating circuit independently of the thermostatic control means and prior to completion of the roasting operation but when the roast reaches a selected internal temperature, said temperature responsive control means comprising a pair of unidirectional current control circuits, a relay connected to both of said control circuits and to the heating circuit, a heat sensitive member whose resistance varies with the temperature inserted substantially centrally in the roast and disposed in one of said control circuits to produce a force in the relay to open the heating circuit, an adjustable temperature calibrated rheostat disposed in the other control circuit to produce a force in the relay to maintain the heating circuit in closed position, means for adjusting said rheostat to vary the current flowing through the other control circuit to oppose operation of the relay until the current flowing through the heat sensitive member in the first mentioned control circuit reaches a predetermined temperature setting of said rheostat to thereby overcome the closing force and open the heating circuit, and an indicator disposed exteriorly of said oven and actuated when the relay is moved to its open position to indicate that the selected internal temperature has been attained in the roast.

THOMAS R. SMITH.

REFERENCES CITED

The following references are of record in the file of this patent:

UNITED STATES PATENTS

| Number | Name | Date |
| --- | --- | --- |
| 915,974 | Leonard | Mar. 23, 1909 |
| 1,022,545 | Gronberg et al. | Apr. 9, 1912 |
| 1,188,734 | Clement | June 27, 1916 |
| 1,229,862 | Bargamin | June 12, 1917 |
| 1,411,396 | Wilson et al. | Apr. 4, 1922 |
| 1,550,155 | Fitzgerald | Aug. 18, 1925 |
| 2,103,513 | Campbell | Dec. 28, 1937 |
| 2,158,133 | Lemp | May 16, 1939 |
| 2,339,635 | Hall | Jan. 18, 1944 |
| 2,421,452 | Cody | June 3, 1947 |
| 2,427,444 | Colombo | Sept. 16, 1947 |